United States Patent [19]
Livingston

[11] Patent Number: 5,900,620
[45] Date of Patent: May 4, 1999

[54] MAGIC MIRROR HOT SPOT TRACKER

[75] Inventor: Peter M. Livingston, Palos Verdes, Calif.

[73] Assignee: TRW Inc., Redondo Beach, Calif.

[21] Appl. No.: 08/920,538

[22] Filed: Aug. 27, 1997

[51] Int. Cl.$^6$ .................................................. G01S 17/66
[52] U.S. Cl. ..................................... 250/203.2; 250/203.3
[58] Field of Search ............................. 250/203.2, 203.1, 250/203.3, 225, 203.6; 356/4.01

[56] References Cited

U.S. PATENT DOCUMENTS

| | | | |
|---|---|---|---|
| 3,799,676 | 3/1974 | Chatterton | 356/152 |
| 3,946,233 | 3/1976 | Erben et al. | 250/347 |
| 3,954,340 | 5/1976 | Blomqvist et al. | 356/152 |
| 4,383,734 | 5/1983 | Huignard et al. | 350/162.13 |
| 4,669,682 | 6/1987 | Diehl et al. | 244/3.13 |
| 4,676,455 | 6/1987 | Diehl et al | 244/3.13 |
| 4,975,555 | 12/1990 | Schimdt et al. | 250/203.2 |
| 5,198,607 | 3/1993 | Livingston . | |
| 5,216,236 | 6/1993 | Blais | 250/203.2 |
| 5,253,033 | 10/1993 | Lipchak et al. | 356/5 |
| 5,345,304 | 9/1994 | Allen | 356/5 |
| 5,440,144 | 8/1995 | Barbier et al. | 250/206.2 |
| 5,600,434 | 2/1997 | Warm et al. | 356/139.08 |
| 5,780,838 | 7/1998 | Livingston et al. | 250/203.2 |
| 5,780,839 | 7/1998 | Livingston | 250/203.2 |

OTHER PUBLICATIONS

"Boresighting a Gaussian Beam on a Specular Target Point: A Method Using Conical Scan," Erteza, Ahmed, *Applied Optics*, vol. 15, 1976 pp. 656–660.

"Laser Beam Active Tracking for Specular Objects to Fractions of λ/D" Livingston, Peter, M., Jacoby, Jerold L., and Tierney, William S., *Applied Optics*, vol. 24, 1985 pp. 1919–1925.

"Flexure–Beam Micromirror Spatial Light Modulator Devices For Acquisition, Tracking, and Pointing" Rhoadarmer, Troy A., Gustafson, Steven C., Little, Gordon R. and Lin, Tsen–Hwang, *SPIE*, vol. 2221 1994 pp. 418–430.

*Primary Examiner*—Edward P. Westin
*Assistant Examiner*—Thanh X. Luu
*Attorney, Agent, or Firm*—Michael S. Yatsko

[57] ABSTRACT

An image tracker (10) that tracks an object (16) targeted for engagement by a laser weapon (12). The tracker (10) includes receiver optics (31) that receive radiation (30) from both a detected target (16) and a laser beam (14) incident thereon, and a polarizing beam splitter (44) that splits the radiation into a first beam of reflected laser radiation (46) and a second beam of detected target radiation (47). The polarizing beam splitter (44) reflects the first beam of reflected laser radiation (46) in a first direction for imaging purposes and linearly polarizes the second beam of detected target radiation (47). A beam polarizer (60) circularly polarizes the second beam of detected target radiation. A micromirror array (66) reflects the circularly polarized detected target radiation back through the beam polarizer (60) to linearly polarize the second beam of detected target radiation (47). Tracker electronics (33) adjust the reflectivity of the micromirror array (66) to ensure that the radiation incident on the array is at or below a predetermined irradiance threshold level. Therefore, the reflected laser radiation does not affect the imaging of the targeted object. The linearly polarized detected target radiation beam is then reflected by the beam splitter (44) in a second direction for imaging purposes. The tracker of the present invention enhances the probability of a target kill, as the actual laser beam hit spot (20) on the target is tracked relative to the target position.

24 Claims, 4 Drawing Sheets

MAGIC MIRROR HOT SPOT TRACKER

CROSS REFERENCE TO RELATED APPLICATIONS

The present application contains subject matter in common with pending U.S. patent application Ser. No. 08/919,080, entitled "Self-Referencing Trackers", and pending U.S. patent application Ser. No. 08/919,413, entitled "Dichroic Active Tracker", both of which are assigned to TRW Inc., assignee of the present invention.

BACKGROUND OF THE INVENTION

1. Technical Field

The present invention relates generally to systems for tracking moving objects and, in particular, to a self-referencing, imaging tracker that separately images target and target hit spot radiation and, through use of a micromirror array, polarizes target radiation to ensure that only radiation at the target hit spot wavelength is imaged, thereby allowing a laser beam to be more accurately locked onto, and maintained at, a desired target aim point until a target kill is achieved.

2. Discussion

Image trackers are often used in conjunction with lasers or other weaponry to disable inflight missiles. Conventional image trackers presently employ only non-self-referencing schemes for directing a laser beam to a desired target aimpoint. In practice, this means that the laser beam direction in space is inferred from the tracker line of sight as the tracker tracks the missile.

Trackers using imaging, non-self-referencing techniques typically utilize one or more imaging devices, such as electronic cameras, that first determine an approximate, or wide field of view (WFOV) position, and then an instantaneous, or narrow field of view (NFOV), position of a targeted object. After capturing the target image in the NFOV's track gate, the tracker, under servo-loop control, follows the target. In most instances, the tracker is physically mounted on gimbals in a beam pointer. Therefore, the pointer line-of-sight also tracks the target if the pointer and tracker are properly boresighted.

Although conventional imaging, non-self-referencing trackers often provide adequate target location functions, a number of limitations exist with such systems. For example, in medium wave forward looking infrared (FLIR) based trackers, the laser weapon used for target engagement often interferes with the tracker imaging system, as instantaneous non-specular return from the laser hit spot on the object often blinds the camera, or, at least causes the camera automatic gain control to reduce camera gain to accommodate the bright laser hit spot, thereby losing all target image information. Typically, the laser-reflected power is some 40 to 60 dB greater than the target thermal signature. Additionally, with regard to long wave FLIR based systems, bright thermal energy from heated war heads may also blind such systems, causing the systems to lose track of the targeted object.

Solutions to the above problems include programming the system to select a laser aim point outside of the narrow field of view (NFOV) or the use of short wave infrared (SWIR) track bands with active illumination, causing the laser return to be invisible to the NFOV SWIR camera. If the laser aim point is selected outside of the view of NFOV however, the laser beam pointing must be determined by feed forward estimation. Such an aim point selection is undesirable, as it eliminates missile nose-kill possibilities, and is subject to estimation noise as explained earlier. Alternatively, if a short wavelength IR track band is used, the laser beam pointing must also be done via feed forward estimation. Such a scheme increases the susceptibility of the tracker to atmospheric disturbances.

Additionally, with non-self-referencing imaging trackers, the tracker line-of-sight must be accurately boresighted with the laser weapon line of sight. Due to the design of such systems, it has been found difficult to maintain an accurate bore sight under adverse environmental conditions.

Self-referencing trackers solve the above described limitations of the conventional imaging, non-self-referencing trackers by referencing the laser beam instantaneous position to the target image itself rather than to the tracker line-of-sight direction. Also, self-referencing trackers have lines of sight that need not be coaxial with the laser weapon, thereby subsequently minimizing the weight on the system gimbals and simplifying system transmit optics.

Presently, non-imaging self-referencing trackers, such as the systems disclosed in pending U.S. patent application Ser. No. 08/631,645, entitled "Laser Crossbody Tracking System and Method", and U.S. patent application Ser. No. 08/760,434, entitled "Laser Crossbody and Feature Curvature Tracker" ("the LACROSST patent applications"), both incorporated herein by reference, are known in the art.

Non-imaging self-referencing trackers are presently deployed as vernier trackers; that is, the trackers correct residual image jitter created by imperfect image tracker performance. Thus, the non-imaging tracker bears the major tracking burden for difficult targets, such as small artillery rounds or maneuvering cruise missiles. Non-imaging self-referencing trackers use the laser beam itself to seek and hold onto a glint, such as a cylindrical missile roll axis. Therefore, the laser beam positioning on the target becomes independent of tracker jitter in the jitter direction and within the non-imaging tracker track bandwidth.

Although non-imaging self-referencing systems provide certain advantages over imaging, non-self-referencing systems, there is still room for improvement in the art. For example, there is a need for an imaging, self-referencing laser beam tracker that can be locked onto a desired target aim point, whether or not a glint is present at that point, and held on the aim point at will. In addition, there is a need for an imaging, self-referencing tracker that provides maximum noise immunity from atmospheric optical turbulence through measurement of the laser beam position relative to the position of the target through the same atmospheric path. There is also a need for an imaging, self-referencing tracker that reduces or eliminates the pointing error associated with the estimated aimpoint offset associated with conventional open loop trackers by measuring an actual laser hit spot location on the target relative to the target itself.

SUMMARY OF THE INVENTION

Accordingly, the present invention provides a tracking system that uses a controlled reflectance mirror in conjunction with an optical system. The optical system includes two detector arrays, a polarizing beam splitter, a quarter wave plate, and a narrow band filter centered on the principal laser wavelength. The present invention solves a longstanding tracking problem, in that it allows the laser beam to be placed on and maintained at a desired target aim point without regard to its location relative to the system track gate. Thus, missiles may be attacked at any aspect angle, with the tracker beam insensitive to burning debris and other sources of tracker distraction and tracker loss.

More particularly, the present invention comprises an image tracker that includes optics that receive radiation from both a detected target and a laser beam incident thereon. A polarizing beam splitter splits the radiation into a first beam of reflected laser radiation and a second beam of detected target radiation. The polarizing beam splitter reflects the first beam of reflected laser radiation in a first direction for imaging purposes and linearly polarizes the second beam of detected target radiation. A beam polarizer then circularly polarizes the second linearly polarized beam of detected target radiation. A mirror reflects the circularly polarized detected target radiation back through the beam polarizer to linearly polarize the second beam of detected target radiation and to direct the radiation in an orientation orthogonal to that of the originally polarized radiation. The linearly polarized detected target radiation beam is then reflected by the beam splitter in a second direction for imaging purposes.

DETAILED DESCRIPTION OF THE PREFERRED EMBODIMENTS

Figure 1:
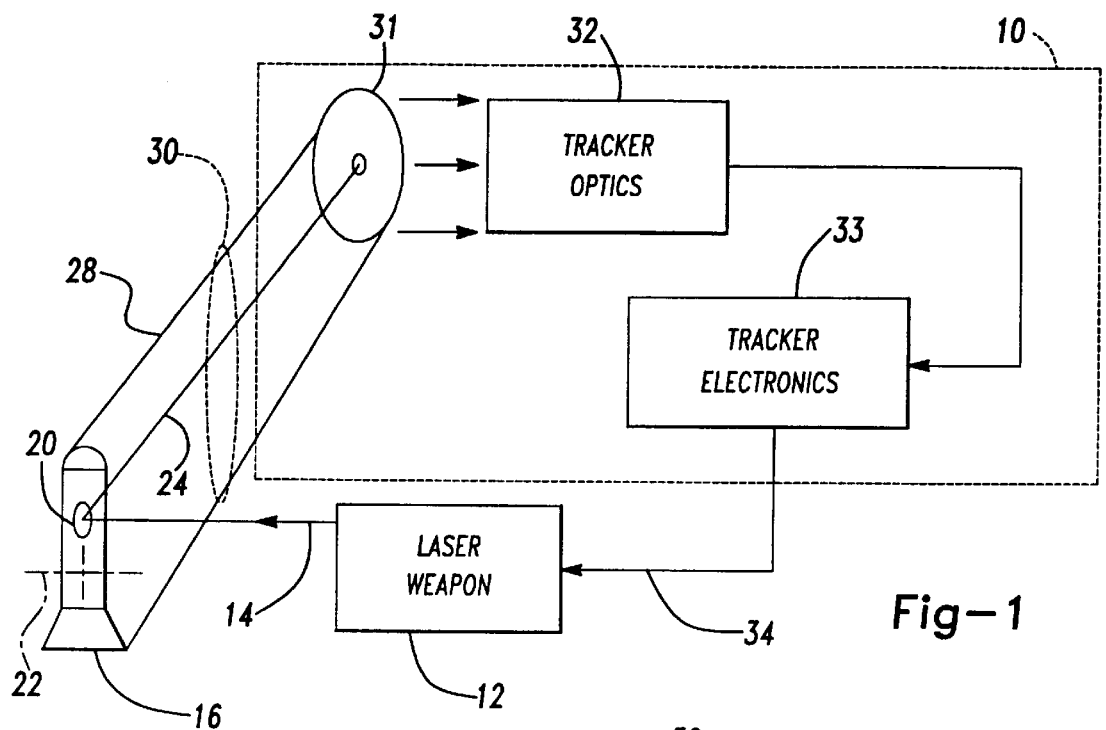
FIG. 1 is a schematic block diagram of a missile tracker according to a preferred embodiment of the present invention.

Referring to FIG. 1, a missile tracker according to a preferred embodiment of the present invention is shown generally at 10. The system is implemented in conjunction with a laser weapon 12 to steer a laser beam 14 produced by the laser weapon into engagement with a target, such as the missile shown at 16. The actual point of engagement of the laser beam, shown at 20 and referred to hereinafter as the laser beam hit spot, initially differs from the desired point of engagement, indicated by weapon system crosshairs 22 and referred to as the target aimpoint. Radiation 24 reflected from the hit spot, in combination with radiation 28 reflected from the missile, form an input cone of radiation, indicated generally at 30. As will now be described, the tracker of the present invention images both the missile 16 and the laser beam hit spot 20 in a manner that minimizes loss of missile information.

Figure 2:
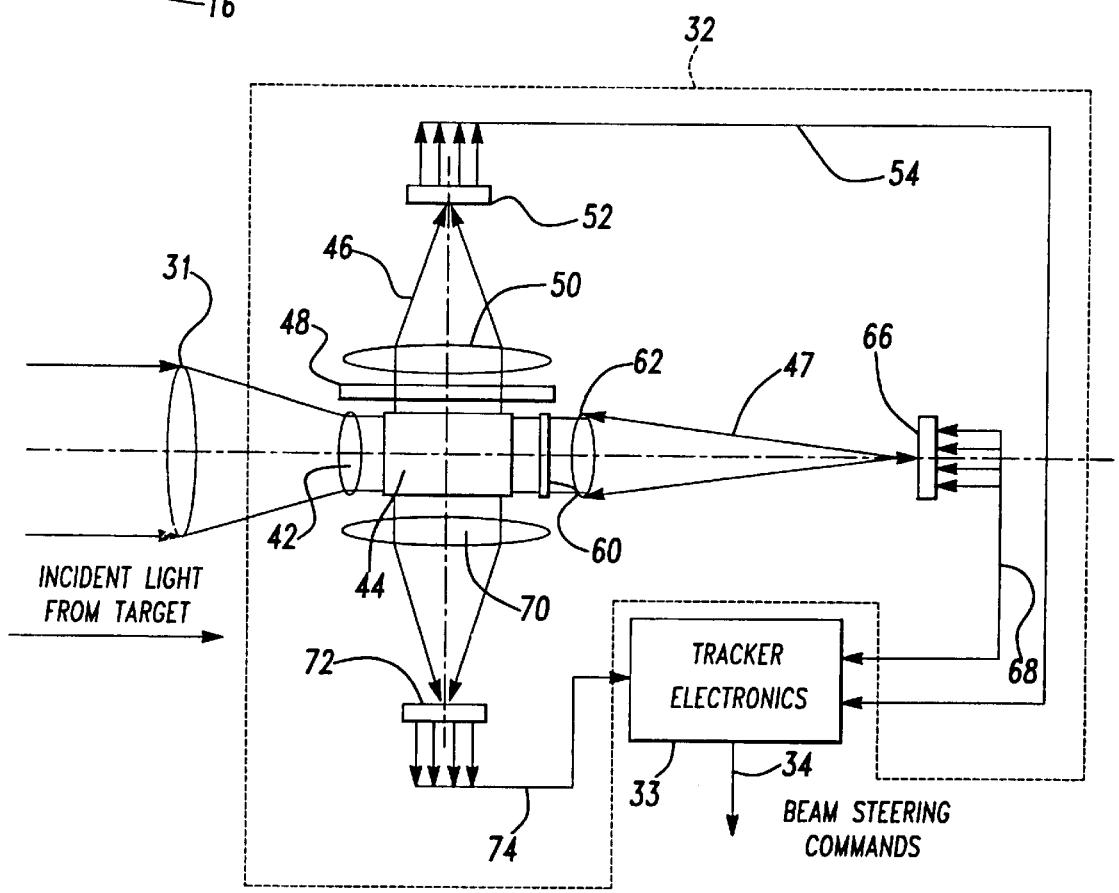
FIG. 2 is a diagram of tracker optics and electronics implemented in the tracker of FIG. 1.

Referring to FIGS. 1 and 2, tracker input optics 31 receive and pass the input cone of radiation 30 to tracker optics 32. As will be described in more detail below, the tracker optics 32 image the missile body and the laser beam hit spot and output the imaging information to tracker electronics 33. The tracker electronics 33 process the imaging information and output laser beam steering commands to the laser weapon 12 at 34. The steering commands close the loop between the target aim point 22 and the laser beam hit spot 20 and maintain the hit spot at the target aim point 22 until a target kill is achieved.

Still referring to FIGS. 1 and 2, the tracker optics 32 are shown in more detail. The optics include a recollimating lens 42. The recollimating lens passes the parallel-ray input cone of radiation 30 onto a polarizing beam splitter 44. The polarizing beam splitter 44 splits the input cone of radiation into two separate beams of radiation. The first beam of radiation at the laser beam wavelength 46 passes through a band pass filter 48, which ensures that only radiation at the laser beam wavelength passes to an imaging lens 50. The imaging lens 50 images the parallel beam of radiation onto a focal plane detector array 52. The detector array is preferably a platinum-silicide or $H_gCdTe$ charge coupled device (CCD) array consisting of a grid of individual sensor elements that each output an electrical signal in response to the radiation incident thereon. Electrical signals generated by the array 52 are output to tracker electronics 33, as indicated at 54.

Still referring to FIG. 2, the beam splitter 44 passes the target image radiation beam 47 through a quarter wave plate 60. The beam of radiation 47 is circularly polarized after it passes through the quarter wave plate 60 before passing through a secondary imaging lens 62. Secondary imaging lens 62 images the beam of radiation onto a flexure beam micromirror array 66. Preferably, the micromirror array consists of a plurality of individual mirror elements that, in combination, reflect the beam of radiation 47 back through the imaging lens 62 and the quarter wave plate 60. The beam of radiation 46, upon passing again through the quarter wave plate 60, becomes linearly polarized with an orientation that is perpendicular to the initial linear polarization. As a result, the radiation is reflected by the beam splitter 44 through secondary imaging lens 70 onto a second focal plane detector array 72 that is similar in structure and function to the detector array 52. Detector array 72 generates and outputs electrical signals, as indicated at 74, to the tracker electronics 33.

Tracker electronics subsequently processes the electrical signals input from lines 54 and 74. Preferably the electronics includes a processor programmed with a target tracking algorithm, such as that disclosed in the pending LACROSST patent applications that have been incorporated by reference. The electronics references the signals from each of the arrays in a common coordinate system along with the target aimpoint. The electronics process signals and output beam steering commands in response thereto to close the distance between the target aimpoint and the laser beam hit spot.

Figure 3A:
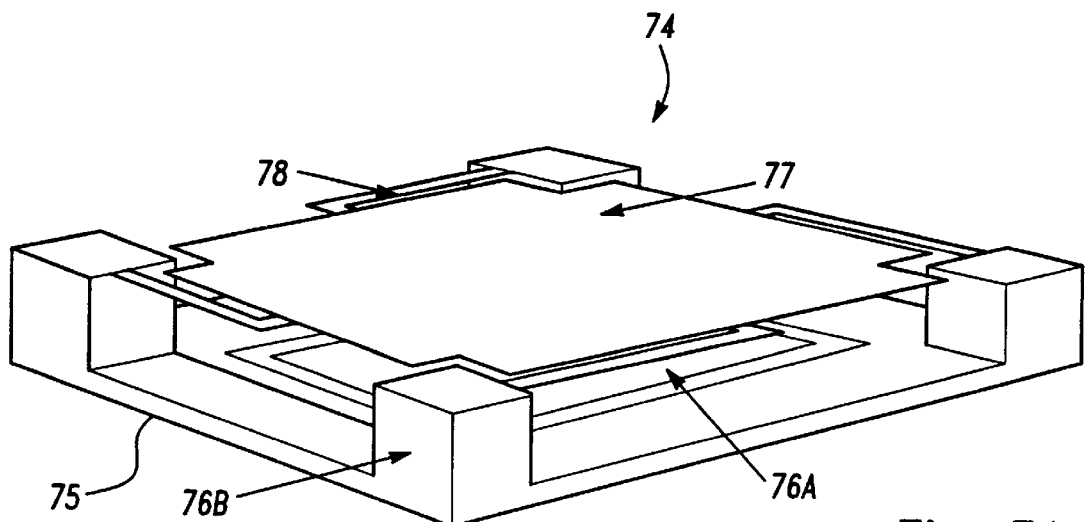
FIGS. 3A and 3B illustrate the components of the flexure beam micromirror array shown in FIG. 2 in greater detail.
Figure 3B:
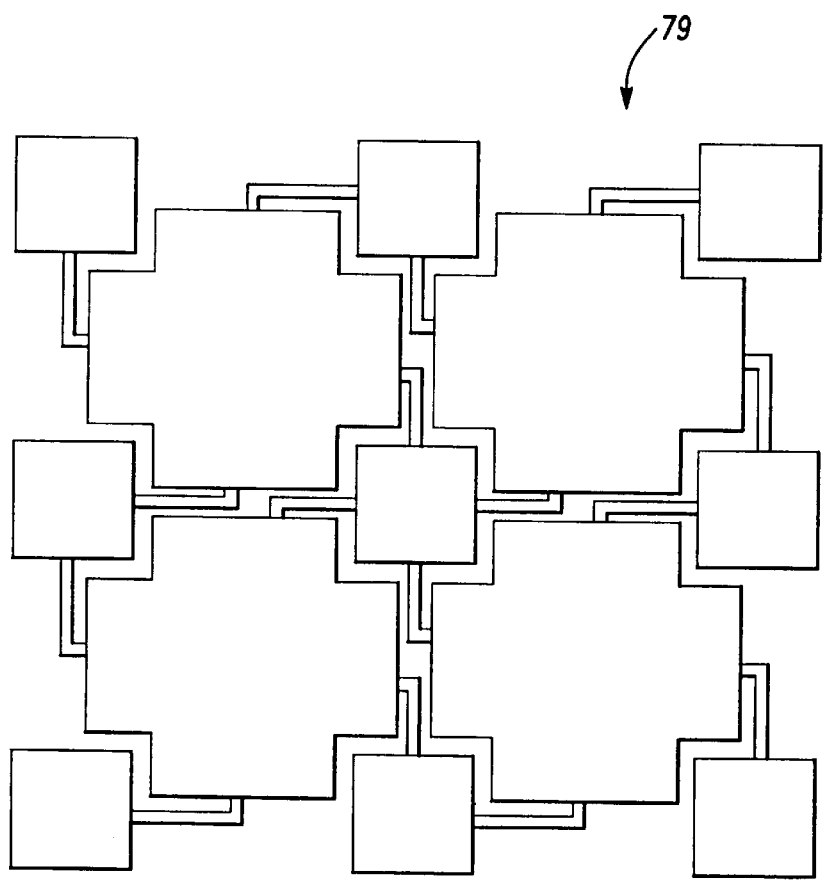

FIGS. 3A and 3B illustrate individual micromirrors that, in combination, form the flexure beam micromirror array 66. A single micromirror unit of the array is shown at 74. Preferably the individual units are micromirror devices that are commercially available from Texas Instruments and sold commercially under the tradename Flex Beam. Each device 74 is composed of a nonconductive base 75 having an address electrode 76a and mirror posts 76b. An active mirror 77 is adjustably connected to the posts 76b via flexure hinges 78. The mirror may be angularly adjusted through application of a driving signal applied to the address electrode, as is well known in the art. A section of the micromirror array of the present invention is shown generally at 79 in FIG. 3B.

Figure 4:
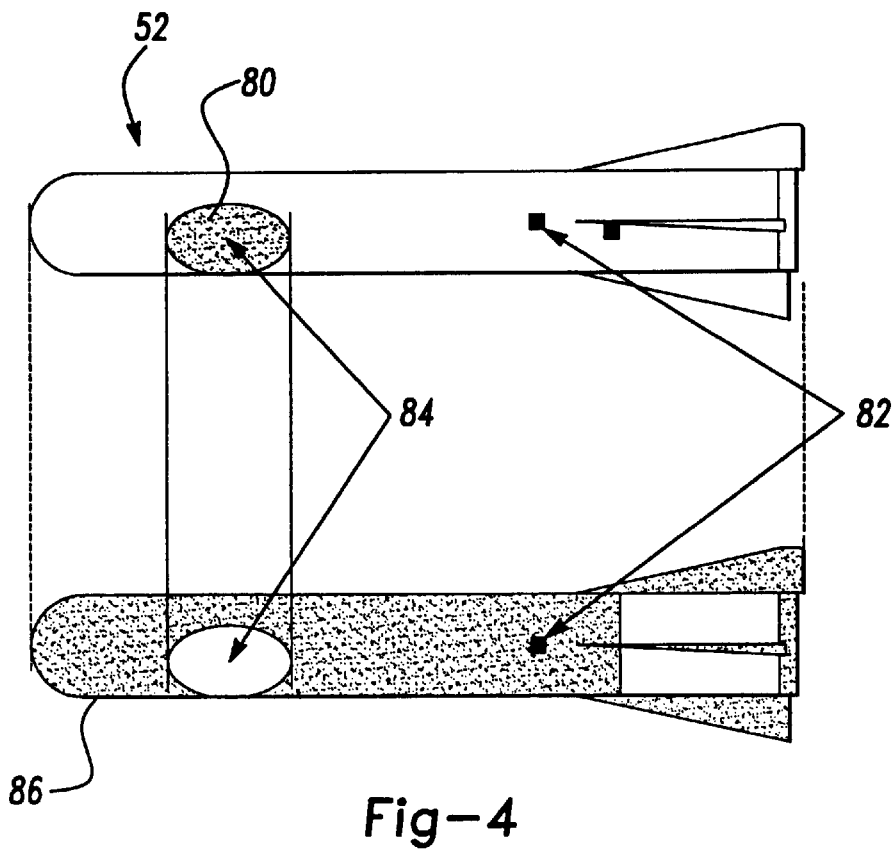
FIGS. 4 and 5 illustrate imaging of both the target and the laser beam hit spot formed on the target by the detector arrays shown in FIG. 2.
Figure 5:
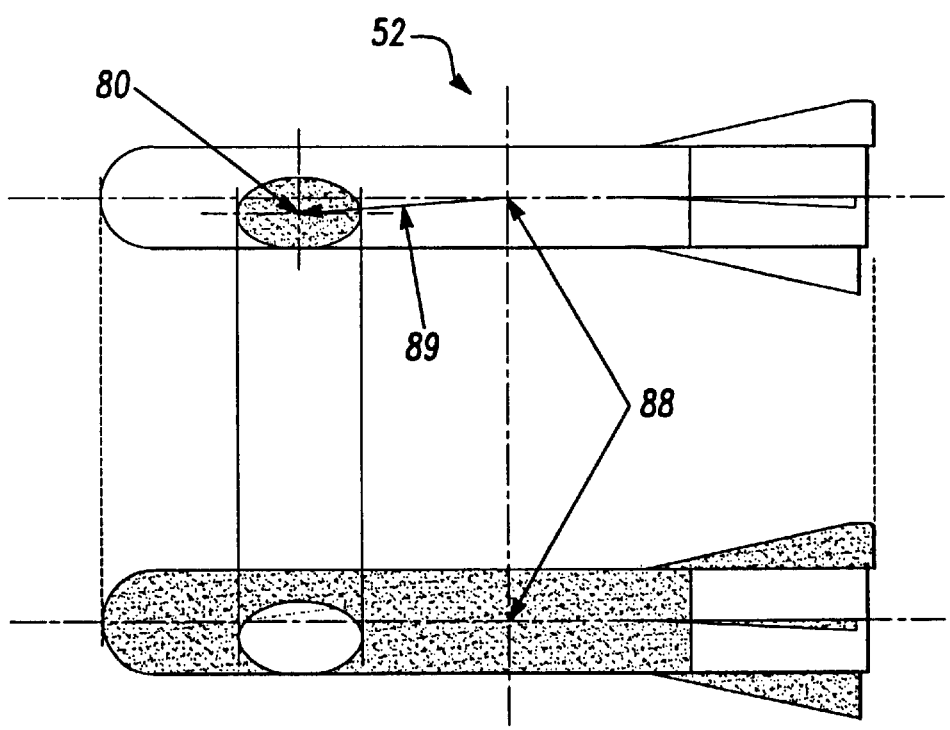

Referring to FIGS. 4 and 5, coregistration of electrical signals generated by the arrays 52, 72 will now be described. As shown in FIG. 4, images generated by the detector arrays 52, 72 are shown. The image generated, shown generally at 80, corresponds to the laser beam hit spot formed by laser beam radiation scattered from the missile target body. As shown, the image of the missile itself is below a detection threshold level and is therefore not imaged by the detector array 52. The filter 48 is preferably as narrow as possible, depending on laser stability, in order to reduce black body energy arising from hot metal of the missile body. Preferably, the narrow band optical filter is centered on the strongest laser line, if the laser has multiple lines.

It should be appreciated that the arrays 52, 72 are aligned, and the focal lengths of lenses 50, 70 are adjusted, such that a given pixel occupies the same relative position in all three arrays, as indicated at 82 in FIG. 4. Corresponding positions are also shown relative to the instantaneous laser beam hit spot formed on the missile target body indicated at 84.

Still referring to FIG. 2, each micromirror element is initially maintained in its maximum reflectivity configuration. If, however, the signal level corresponding to image intensity from a particular pixel in array 72 exceeds a prescribed threshold, a signal is generated that reduces the reflectivity of the corresponding micromirror element by causing it to flutter, thereby maintaining the signal coming from the given pixel in array 72 at a given value. The signal causing the mirror element to flutter has a prescribed wave form such that the fraction of time that the micromirror is in its normal, maximum reflecting state is controllable. Therefore the reflectivity of the individual micromirror elements can be controlled to provide at least a gray scale with 256 steps if that be needed. However, such a gray scale will be entirely adequate for the purposes of this invention because subsequent image processing applied to the output of array 72 will be on a binary image consisting of 1's and 0's. All target elements will therefore be 1's if the signal threshold exceeds the clipping level needed to establish a binary image whereas all background pixels will be set to 0. In this manner, the centroid tracking algorithm will depend only on target shape and not on target reflectivity. As a result, the detector array 72 detects the missile image 86, which is formed from a low level radiation such as long wave infrared radiation, which is lower than the radiation forming the laser beam hit spot, which is typically medium wave infrared radiation. Thus, as shown in FIG. 2, the laser beam hit spot is limited in irradiance by action of the micromirror array 66. The tracker polarization of the target radiation described above ensures that only radiation from the target is passed to the array 72.

Referring to FIG. 5, the reflected laser beam hit spot again is shown at 80. The target aim point is shown at 88. Tracking electronics process the electrical signal outputs from the arrays 52, 72 to determine a displacement vector 89 that represents the spatial difference between the laser beam hit spot 80 and the target aimpoint 88. Because information from the arrays 52, 72 is coregistered and referenced in a common coordinate system, the displacement vector 89 can be determined to some fraction of detector element size in common with all arrays. The electronic system thus is capable of directing the laser beam to any position on the missile body under closed loop control, with the programmed tracking electronics always maintaining the laser beam on the missile midline. Thus, the present invention provides the capability of aiming the laser at any point on the missile, under closed loop control, without the need for detecting a glint off the missile body or other requisite target detection means.

Figure 6:
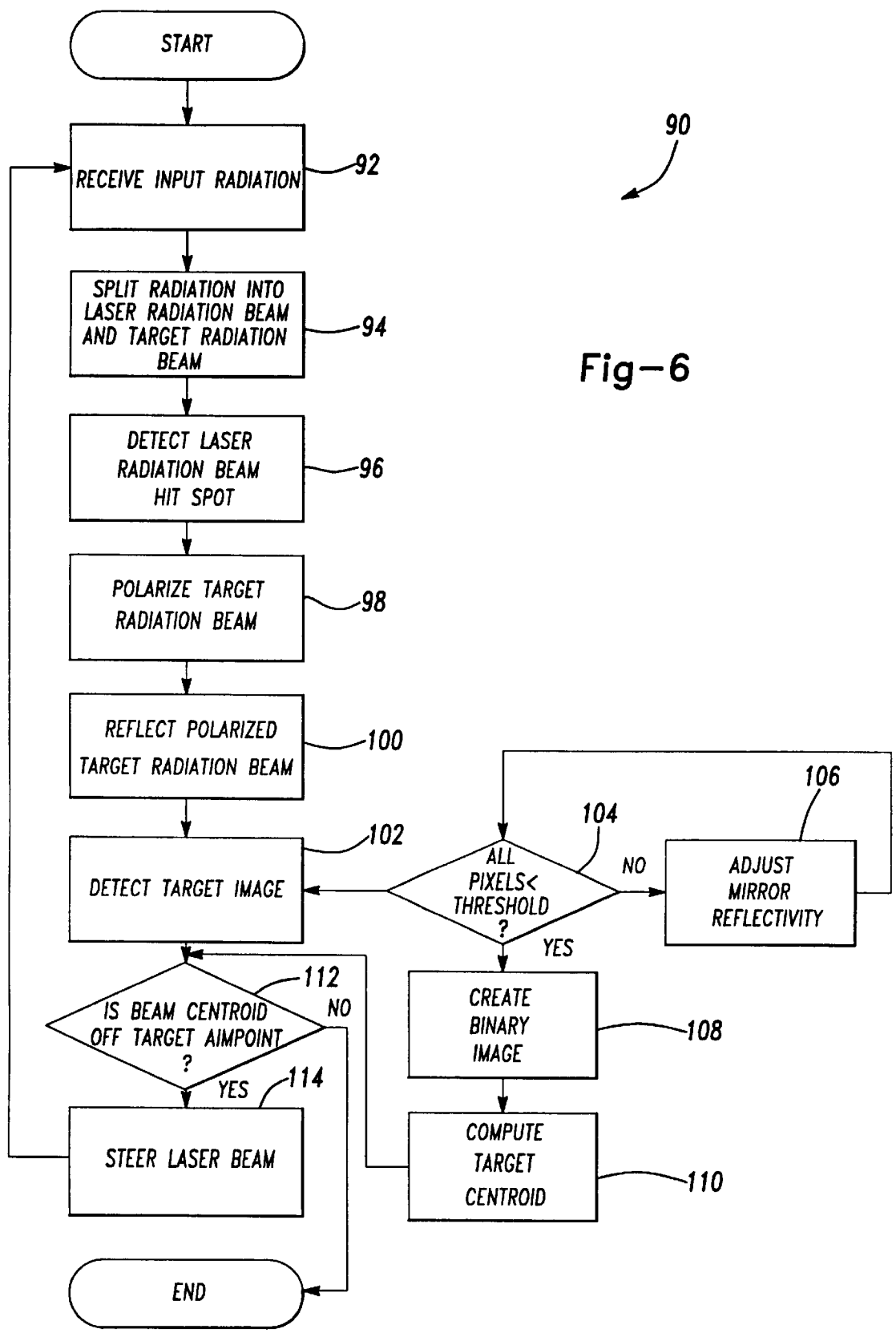
FIG. 6 illustrates a flow diagram methodology associated with the missile tracker of the present invention.

Referring to FIG. 6, a flow diagram illustrating the methodology associated with the missile tracker system of the present invention is shown generally at 90. At 92, the tracker receives input radiation. At 94, the tracker splits the radiation into a laser radiation beam and a target radiation beam. At 96, a tracker detector array detects a laser radiation beam hit spot and generates an image corresponding thereto. At 98, the system polarizes the target radiation beam. At 100, the tracker micromirror array reflects the polarized target radiation beam to create a beam of radiation that is linearly polarized, but having an orientation that is perpendicular to the radiation beam polarized at step 98. At step 102, the tracker detects a target image from the radiation beam reflected at step 100. At step 104, tracker electronics determined if radiation detected by all of the pixels in the mirror array 66 are below a predetermined mirror threshold voltage. At step 106, if all pixels are not below the threshold, tracker electronics adjust the mirror reflectivity until all pixels are below the threshold. Subsequently, at step 108, tracker electronics create a binary image from the image sensed at the detector array 72. At step 110, tracker electronics then compute a target centroid for tracking purposes. At step 112, the tracker system determines if the laser beam hit spot is off from the target aim point. If so, at step 114, the laser beam is steered under closed loop control to the aim point. If the beam hit spot has been steered to the target aim point, the beam hit spot is maintained on the target aim point.

As can be appreciated from the foregoing, the tracker of the present invention allows a laser beam to be locked onto a desired target aim point and maintained at the aim point indefinitely. The self-referencing imaging system of the present invention provides maximum noise immunity from atmospheric optical turbulence, as the position of the laser beam is measured relative to the target position. The system of the present invention thereby increases the accuracy of an associated laser weapon, as the system allows the laser weapon to attack the weakest point of a target, as the tracker does not depend on target glint for tracking purposes. The system of the present invention also increases the range of a laser weapon, as the system is not limited by the tracker image detector.

Various other advantages of the present invention will become apparent to those skilled in the art after having the benefit of studying the foregoing text and drawings, taken in conjunction with the followings claims.

I claim:

1. An image tracker optical system, comprising:
   receiver optics that receive radiation from both a detected target and a laser beam incident thereon;
   a polarizing beam splitter that splits the radiation into a first beam of reflected laser radiation and a second beam of detected target radiation, the polarizing beam splitter linearly polarizing the second beam of detected target radiation and diffracting the first beam of reflected laser radiation in a first direction for imaging purposes;
   a beam polarizer that circularly polarizes the second beam of linearly polarized detected target radiation; and
   a mirror that reflects the circularly polarized detected target radiation back through the beam polarizer to linearly polarize the second beam of detected target radiation, the linearly polarized detected target radiation beam reflected by the beam splitter in a second direction for imaging purposes.

2. The system of claim 1, further comprising an image detector array in optical alignment with the polarizing beam splitter that detects a laser beam hit spot from the first beam of reflected laser radiation, and that detects a target image from the second beam of detected target radiation.

3. The system of claim 2, wherein the mirror comprises an array of micromirrors each having a reflectivity that is controllable by application of particular driving wave forms, the mirror working in conjunction with the image detector array to limit the irradiance on each of the micromirrors in the array of micromirrors.

4. The system of claim 3, wherein the mirror is controllable to specifically limit the detected irradiance on the second beam of detected target radiation resulting from the laser beam hit spot on the detected target.

5. The system of claim 2, wherein the detector array comprises a first detector array in optical communication with the polarizing beam splitter, the first detector array receiving the first beam of reflected laser radiation and generating electrical signals in response thereto; and a second detector array in optical communication with the polarizing beam splitter, the second detector array receiving the second beam of detected target radiation and generating a second plurality of electrical signals in response thereto.

6. The system of claim 5, wherein the first and second detector arrays comprise charge coupled device (CCD) arrays.

7. The system of claim 5, wherein the first and second groups of electrical signals generated by the first and second detector arrays are processed for beam steering purposes.

8. The system of claim 5, wherein the first and second detector arrays comprise focal plane detector arrays.

9. The system of claim 2, wherein the array of micromirrors comprises a flexure beam micromirror array.

10. The system of claim 1, wherein the beam polarizer comprises a quarter wave plate.

11. The system of claim 1, wherein the receiver optics comprise a first receiver lens having a first focal length; and a recollimating lens that receives the detected radiation passed through the receiver lens and that recollimates the detected radiation before passing the detected radiation to the beam splitter.

12. The system of claim 1, further comprising a first detector imaging lens located between the polarizing beam splitter and the first detector array for imaging the first beam of radiation onto the detector; and a second detector imaging lens located between the polarizing beam splitter and the second detector for imaging the second beam of radiation onto the second detector.

13. The system of claim 12, further comprising an optical filter located between the polarizing beam splitter and the first detector imaging lens that passes only radiation at the laser beam wavelength to the first imaging lens.

14. The system of claim 1, wherein the mirror reflects the circularly polarized detected target radiation back through the beam polarizer to linearly polarize the second beam of detected target radiation and to orient the second beam of detected target radiation perpendicularly, with respect to the second beam before it is reflected by the mirror, in a second direction for imaging purposes.

15. A weapon system, comprising:

a laser weapon that outputs a laser beam for target engagement purposes, the laser beam being incident upon a target to form a laser beam hit spot thereon;

a system input that receives detected radiation, including target and laser beam hit spot information;

a beam splitter that splits the detected radiation into a first beam including the laser beam hit spot information, and a second beam including the target image information, the beam splitter diffracting the first beam in a first direction and linearly polarizing the second beam;

a beam polarizer in optical communication with the beam splitter that circularly polarizes the second beam;

a mirror in optical communication with the beam polarizer that reflects the circularly polarized second beam back through the beam polarizer to linearly polarize same, the beam splitter subsequently diffracting the circularly polarized second beam in a second direction;

a first detector that receives the first beam and that generates a first group of electrical signals corresponding thereto; and a second detector that receives the second beam and that generates a second group of electrical signals corresponding thereto.

16. The system of claim 15, further comprising tracker electronics operatively connected to first and second detectors to receive signals therefrom and output laser weapon control commands in response thereto.

17. The system of claim 15, wherein the beam polarizer comprises a quarter wave plate located in optical alignment between the polarizing beam splitter and the second detector array.

18. The system of claim 15, wherein the mirror comprises a flexure beam micromirror array.

19. The system of claim 15, wherein each micromirror in the flexure beam micromirror array is controllable to limit irradiance falling thereon if the irradiance falling thereon is above a predetermined irradiance threshold.

20. The system of claim 15, wherein the tracker electronics includes automatic gain control means to adjust the gain associated with the first and second arrays to prevent saturation of the detected laser beam hit spot signal.

21. The system of claim 15, wherein the system forms a closed loop control system.

22. A method of tracking and targeting a moving object, comprising the steps of:

receiving incident radiation from both a targeted object and from a laser beam incident thereon;

separating the incident radiation into a first beam of radiation from the laser beam reflected therefrom and a second beam of radiation from the targeted object;

reflecting the first beam of laser beam radiation in a first direction for beam imaging purposes;

circularly polarizing the second beam of radiation from the targeted object;

reflecting the circularly polarized second beam of targeted object radiation in a manner that linearly polarizes the second beam; and reflecting the second beam of targeted object radiation in a second direction for targeted object imaging purposes.

23. The method of claim 22, wherein the step of reflecting the circularly polarized second beam of targeted object radiation in a manner that linearly polarizes the second beam comprises the step of reflecting the circularly polarized second beam of targeted object radiation to linearly polarize the second beam with an orientation perpendicular to that of the targeted object radiation prior to the step of circularly polarizing the second beam of radiation from the targeted object.

24. The method of claim 22, wherein the step of reflecting the circularly polarized second beam of targeted object radiation in a manner that linearly polarizes the second beam further comprises the steps of:

determining in a segmented manner whether the circularly polarized second beam of targeted object radiation falls below a predetermined irradiance threshold;

modifying the step of reflecting the circularly polarized second beam of targeted object radiation if the second beam of targeted object radiation does not fall between the predetermined irradiance threshold to cause the polarized second beam of radiation to fall below the predetermined irradiance threshold.

\* \* \* \* \*